(12) United States Patent
Shah et al.

(10) Patent No.: US 8,144,226 B2
(45) Date of Patent: Mar. 27, 2012

(54) TWO-BY-TWO PIXEL STRUCTURE IN AN IMAGING SYSTEM-ON-CHIP

(75) Inventors: Joey Shah, Thousand Oaks, CA (US); Laurent Blanquart, Westlake Village, CA (US)

(73) Assignee: AltaSens, Inc, Westlake Village, CA (US)

( * ) Notice: Subject to any disclaimer, the term of this patent is extended or adjusted under 35 U.S.C. 154(b) by 627 days.

(21) Appl. No.: 11/969,302

(22) Filed: Jan. 4, 2008

(65) Prior Publication Data
US 2009/0173974 A1    Jul. 9, 2009

(51) Int. Cl.
*H04N 3/14* (2006.01)
*H04N 5/335* (2006.01)

(52) U.S. Cl. ........................................ 348/303
(58) Field of Classification Search .................. 348/283, 348/303, 304, 316
See application file for complete search history.

(56) References Cited

U.S. PATENT DOCUMENTS

| | | | | |
|---|---|---|---|---|
| 6,377,304 B1* | 4/2002 | Saitoh | | 348/308 |
| 6,956,605 B1* | 10/2005 | Hashimoto | | 348/301 |
| 6,961,088 B2* | 11/2005 | Kameshima et al. | | 348/303 |
| 7,646,413 B2* | 1/2010 | Hashimoto | | 348/272 |
| 7,880,786 B2* | 2/2011 | Muramatsu | | 348/302 |
| 2004/0100571 A1* | 5/2004 | Spears | | 348/273 |
| 2005/0012836 A1* | 1/2005 | Guidash | | 348/302 |
| 2005/0237406 A1* | 10/2005 | Kim et al. | | 348/308 |
| 2007/0052055 A1* | 3/2007 | McKee | | 257/462 |
| 2010/0085456 A1* | 4/2010 | Ito et al. | | 348/302 |

OTHER PUBLICATIONS

Fry, et al. "Fixed-Pattern Noise in Photomatrices" (Oct. 1970) IEEE Journal of Solid-State Circuits vol. 5 No. 5, 5 pages.

* cited by examiner

*Primary Examiner* — Albert Cutler
(74) *Attorney, Agent, or Firm* — Turocy & Watson, LLP

(57) ABSTRACT

The claimed subject matter provides systems and/or methods that facilitate mitigating an impact resulting from mismatch between signal chains in a CMOS imaging System-on-Chip (iSoC) sensor. Two-by-two pixel structures can be a basic building block upon which a pixel array is constructed. Further, each two-by-two pixel structure can be associated with a read bus that carries a sampled signal to a top end and a bottom end of a chip. Moreover, multiplexers at either end of the chip can select a subset of the read buses from which to receive a subset of the sampled signals. Accordingly, pixels in a first color plane can be read, processed, etc. on the same side of the chip (e.g., utilizing a common signal chain), while pixels in at least one second color plane can be read, processed, etc. on the other side of the chip (e.g., employing a differing signal chain).

20 Claims, 11 Drawing Sheets

TWO-BY-TWO PIXEL STRUCTURE IN AN IMAGING SYSTEM-ON-CHIP

BACKGROUND

Recent technological advances have led to complementary metal-oxide-semiconductor (CMOS) sensor imagers being leveraged by cameras, video systems, and the like. CMOS sensor imagers can include an integrated circuit with an array of pixel sensors, each of which can comprise a photodetector. Moreover, a CMOS sensor imager can be incorporated into a System-on-Chip (SoC). As such, the SoC can integrate various components (e.g. analog, digital, . . . ) associated with imaging into a common integrated circuit. For instance, the SoC can include a microprocessor, microcontroller, or digital signal processor (DSP) core, memory, analog interfaces (e.g. analog to digital converters, digital to analog converters), and so forth.

Visible imaging systems implemented using CMOS imaging sensors can reduce costs, power consumption, and noise while improving resolution. For instance, cameras can use CMOS imaging System-on-Chip (iSoC) sensors that efficiently marry low-noise image detection and signal processing with multiple supporting blocks that can provide timing control, clock drivers, reference voltages, analog to digital conversion, digital to analog conversion and key signal processing elements. High-performance video cameras can thereby be assembled using a single CMOS integrated circuit supported by few components including a lens and a battery, for instance. Accordingly, by leveraging iSoC sensors, camera size can be decreased and battery life can be increased. Also, dual-use cameras have emerged that can employ iSoC sensors to alternately produce high-resolution still images or high definition (HD) video.

A CMOS imaging sensor can include an array of pixel cells, where each pixel cell in the array can include a photodetector (e.g., photogate, photoconductor, photodiode, . . . ) that overlays a substrate for yielding a photo-generated charge. A readout circuit can be provided for each pixel cell and can include at least a source follower transistor. The pixel cell can also include a floating diffusion region connected to a gate of the source follower transistor. Accordingly, charge generated by the photodetector can be sent to the floating diffusion region. Further, the imaging sensor can include a transistor for transferring charge from the photodetector to the floating diffusion region and another transistor for resetting the floating diffusion region to a predetermined charge level prior to charge transference.

Generally, advancements associated with CMOS sensor imagers have yielded more functionality typically being incorporated into the imagers over time, while physical sizes of the imagers have tended to decrease, thereby increasing device density. As designs for CMOS sensor imagers include smaller and smaller footprints, pixel cell sizes can accordingly be diminished. Shrinking pixel cell dimensions decreases pitch in the column direction (as well as pitch in the vertical direction). Further, each column typically has a respective circuit for sampling the pixel cells in the column; thus, as the column pitch is decreased, greater difficulty can be encountered for shrinking the sampling circuitry. By way of example, pitch in the column direction of each pixel cell in a pixel array can be 2 microns, and therefore, the column circuitry associated with each column can likewise be decreased to 2 microns in this direction, which can be difficult at best to accomplish while maintaining high sensor performance.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The claimed subject matter relates to systems and/or methods that facilitate mitigating an impact resulting from mismatch between signal chains in a CMOS imaging System-on-Chip (iSoC) sensor. Two-by-two pixel structures can be a basic building block upon which a pixel array is constructed. Further, each two-by-two pixel structure can be associated with a read bus that carries a sampled signal to a top end and a bottom end of a chip. The read bus and/or other constituents can be shared between pixels of an adjoining row or column. Moreover, multiplexers at either end of the chip can select a subset of the read buses from which to receive a subset of the sampled signals. Accordingly, pixels in a first color plane can be read, processed, etc. on the same side of the chip (e.g., utilizing a common signal chain), while pixels in at least one second color plane can be read, processed, etc. on the other side of the chip (e.g. employing a differing signal chain.

According to various aspects, a CMOS imaging system-on-chip (iSoC) sensor can include a pixel array constructed from two-by-two pixel structure building blocks. Further, read buses can transfer sampled signals from corresponding two-by-two pixel structures oriented in a column direction of the pixel array. As such, the read buses can traverse through the pixel array in a row direction. Moreover, multiplexers can be positioned at ends of the read buses. The multiplexers can each select a subset of the read buses from to receive a subset of the sampled signals.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

Figure 1:
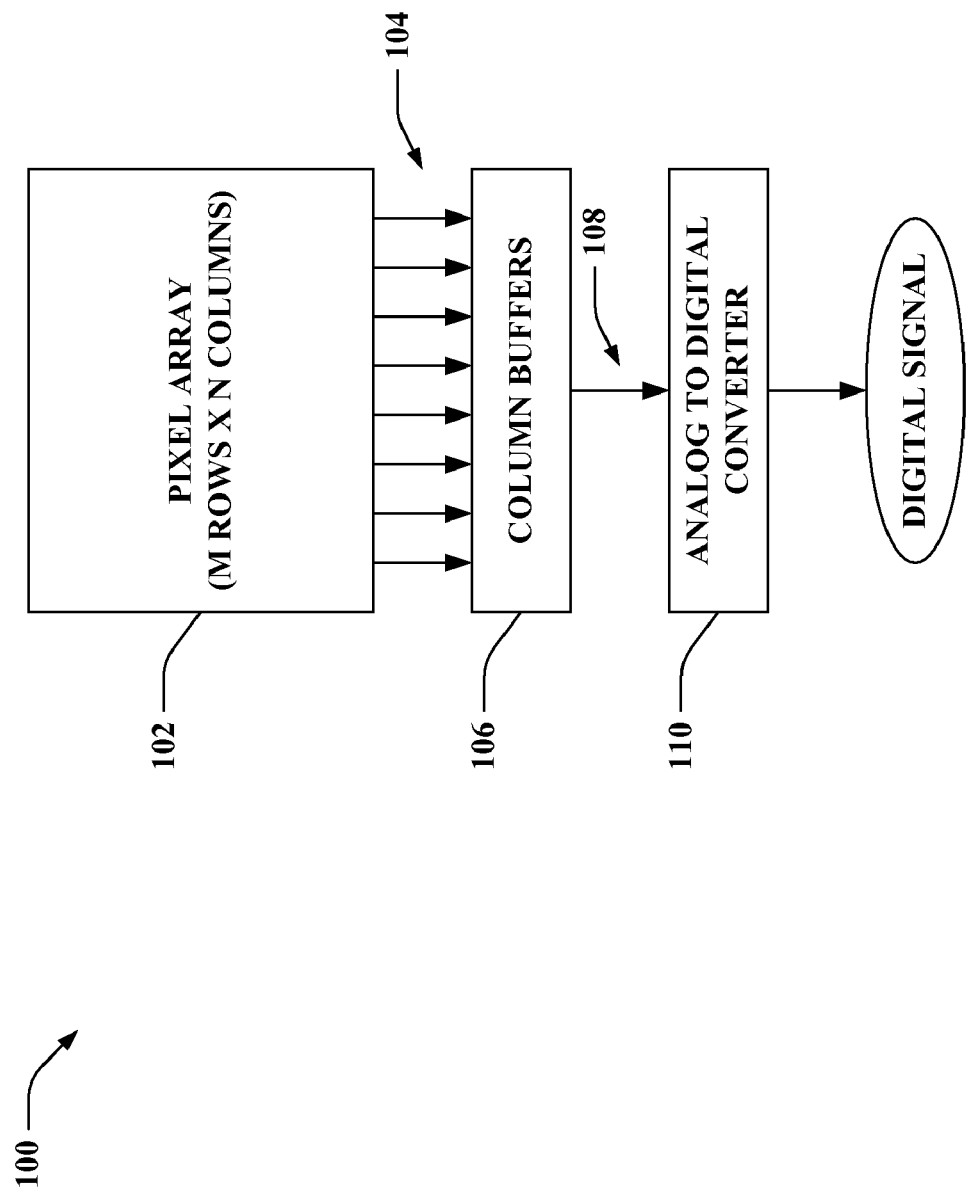
FIG. 1 illustrates a block diagram of an example system that generates digital signals by employing a CMOS sensor imager.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

With reference to FIG. 1, illustrated is a system 100 that generates digital signals by employing a CMOS sensor imager. The system 100 can be associated with a CMOS sensor imager utilized in connection with a camcorder, digital camera, microscope, video system, and/or the like. The system 100 comprises a pixel array 102 that can include M rows and N columns of pixel cells, where M and N can be any integers. Each pixel in the pixel array 102 can comprise a photodetector (e.g., photogate, photoconductor, photodiode, . . . ). Further, each pixel in the pixel array 102 can be utilized to detect a particular color of light; thus, a subset of the pixels in the pixel array 102 can operate in response to red light (R pixels), a disparate subset of the pixels can operate based upon blue light (B pixels) and a further subset of the pixels can operate as a function of green light (G pixels). The pixels in the pixel array 102 can be arranged in a pattern. For instance, the pattern can include a first set of rows that include alternating R pixels and G pixels and a second set of rows that include alternating B pixels and G pixels. Further, the M rows in the pattern can alternate between a row from the first set (e.g., row comprising alternating R pixels and G pixels) and a row from the second set (e.g., row comprising alternating B pixels and G pixels).

An image focused on the pixel array 102 can cause the R pixels, B pixels and G pixels to convert incident light into electrical energy. Signals obtained by the pixel array 102 can be processed on a column by column basis; thus, a particular row of pixels from the pixel array 102 can be selected to be read. The system 100 can further include a plurality of read buses 104 that can transfer the contents from the pixels in the pixel array 102 in the selected row. According to an illustration, the system 100 can include N read buses 104, where each read bus 104 can be associated with a respective column of the pixel array 102. By way of further example, pixels in the pixel array 102 can share read buses 104, and thus, the system 100 can include fewer than N read buses 104.

Each read bus 104 can carry content (e.g., sampled signals) from the pixels to a respective column buffer 106. The system 100 can include N column buffers 106 or fewer, for instance. The column buffers 106 can amplify (e.g., condition) the signals from the pixels. Further, each column buffer 106 can enable low noise readout and can condition the signal from a pixel positioned at one of the rows in the column (or columns) corresponding to the column buffer 106.

After processing by the column buffers 106, outputted values from each of the column buffers 106 can be retained. Moreover, each of the column buffers 106 can be associated with respective circuitry (e.g. capacitor, switch, . . . ) (not shown). Such circuitry can sample and hold outputted values from the corresponding column buffers 106. Further, the circuitry can enable the respective outputted values to be communicated via a bus 108 one at a time; thus, the voltages generated by the column buffers 106 can be multiplexed over the bus 108. The bus 108 can enable communicating each of the outputted values from the respective column buffers 106 to an analog to digital converter (ADC) 110. The ADC 110 can digitize the sampled signal to yield a digital signal. The digital signal can thereafter be provided to disparate component(s) (not shown) for further processing, manipulation, storage, and so forth.

As dimensions of the pixels in the pixel array 102 decrease, more difficulty can be encountered in connection with shrinking the column circuitry (including the column buffers 106) that yields the sampled signals. Pursuant to an illustration, if every column in the pixel array 102 is associated with a respective column buffer 106, then a decrease of the pitch in the column direction of each pixel yields a corresponding decrease in each column buffer 106. To attempt to mitigate this density issue, read buses 104 can be shared between more than one pixel, for instance. According to an illustration, one read bus 104 and one column buffer 106 can be utilized with every two columns of pixels, which can effectively double the pitch for the column circuitry (e.g., if the pitch of each pixel in the column direction is 2 microns, then the pitch of each column buffer 106 (and associated column circuitry) can be 4 microns).

Further alleviation of density constraints can be provided by positioning half of the readout circuits (e.g., the column buffers 106/column circuitry) at a top end of the pixel array 102 and the other half of the readout circuits at a bottom end of the pixel array 102 (FIG. 1 depicts the readout circuits being located at one end (top or bottom) of the pixel array 102 rather than two). Therefore, the pitch of the column circuitry can effectively be doubled yet again (e.g., 8 microns following the above illustration when sharing of read buses 104 is also employed). When the readout circuits are separated, disparate analog to digital converters 110 can be utilized with each group of readout circuits. Further, differing references can be applied to the different groups. Even though the analog to digital converters 110, references, etc. can be identically designed, actual physical differences can be introduced by employing physically different circuits, references, and so forth. Accordingly, mismatch between gains, offsets, and the like can result. Thus, the system 100 can account for such mismatch by processing pixels of each color with one group of readout circuits (e.g., therefore employing a common ADC 110, references, etc. for each color).

Figure 2:
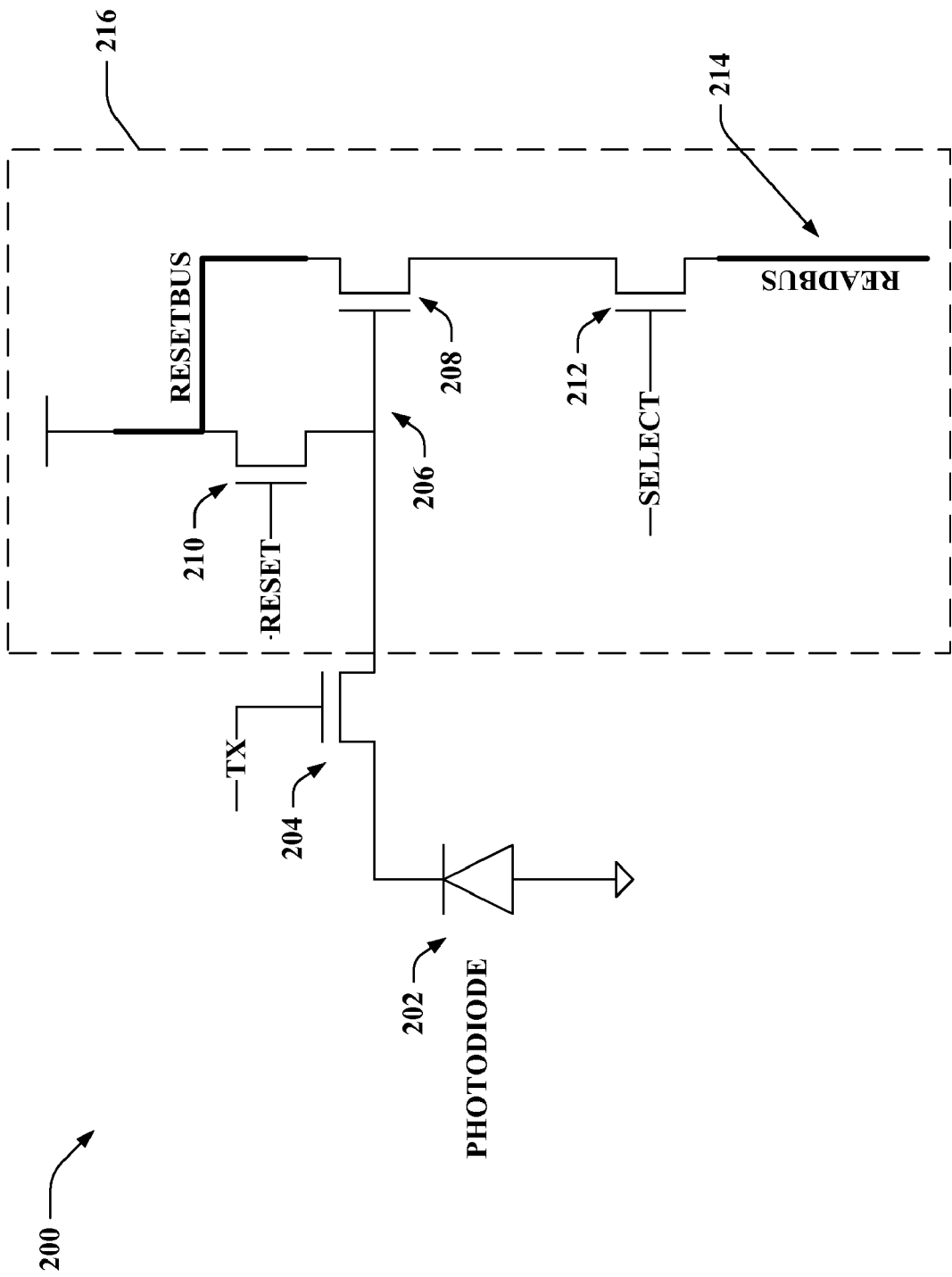
FIG. 2 illustrates an example CMOS imager pixel cell that can be included in a pixel array.

Now turning to FIG. 2, illustrated is an example CMOS imager pixel cell 200 that can be included in a pixel array (e.g., the pixel array 102 of FIG. 1). The pixel cell 200 includes a photodiode 202 connected to a transfer transistor 204. The transfer transistor 204 is further connected to a floating diffusion region (FD) 206. The floating diffusion region 206 connects to a source follower transistor 208 and a reset transistor 210. The source follower transistor 208 is further connected to a select transistor 212. The select transistor 212 can be employed to select a particular row of pixel cells from a pixel array.

The photodiode 202 can be charged by converting optical energy to electrical energy. For instance, the photodiode 202 can have sensitivity to a particular type of incident light (e.g., red light, blue light, green light). Moreover, the type of light to which the photodiode 202 is sensitive can indicate a type of the pixel cell 200 (e.g., R pixel, B pixel, G pixel).

According to an illustration, the floating diffusion region 206 can be reset to a known state before transfer of charge to it. Resetting of the floating diffusion region 206 can be effectuated by the reset transistor 210. Further, the transfer transistor 204 can transfer charge (e.g., yielded by the photodiode 202) to the floating diffusion region 206. The charge can be transferred based upon a transfer signal (TX) received at a gate of the transfer transistor 204. Moreover, the pixel cell 200 (along with other pixel cell(s) in the same row of the pixel array) can be selected for readout by employing the select transistor 212. Readout can be effectuated via a read bus 214 (e.g., one of the read buses 104 of FIG. 1). Further, the source follower transistor 208 can output and/or amplify a signal representing a reset voltage (e.g. provided via a reset bus) and a pixel signal voltage based on the photo converted charges.

Pixel size within an array can be reduced by sharing components between pixel cells (e.g., the pixel cell 200). For instance, components included within box 216 can be shared amongst two or more pixel cells (e.g., four-way sharing can leverage the pixel cell 200 and three additional pixel cells (not shown)). Accordingly, the photodiode 202 and the transfer transistor 204 can be non-shared components unique to each pixel cell 200 (e.g., each of the other three pixel cells can include respective photodiodes and transfer transistors), while the floating diffusion region 206, the source follower transistor 208, the reset transistor 210, the select transistor 212, and the read bus 214 can be shared between the four pixel cells. By sharing components between pixels, pixel dimensions can be reduced, and thus, density within the pixel array can be increased.

Figure 3:
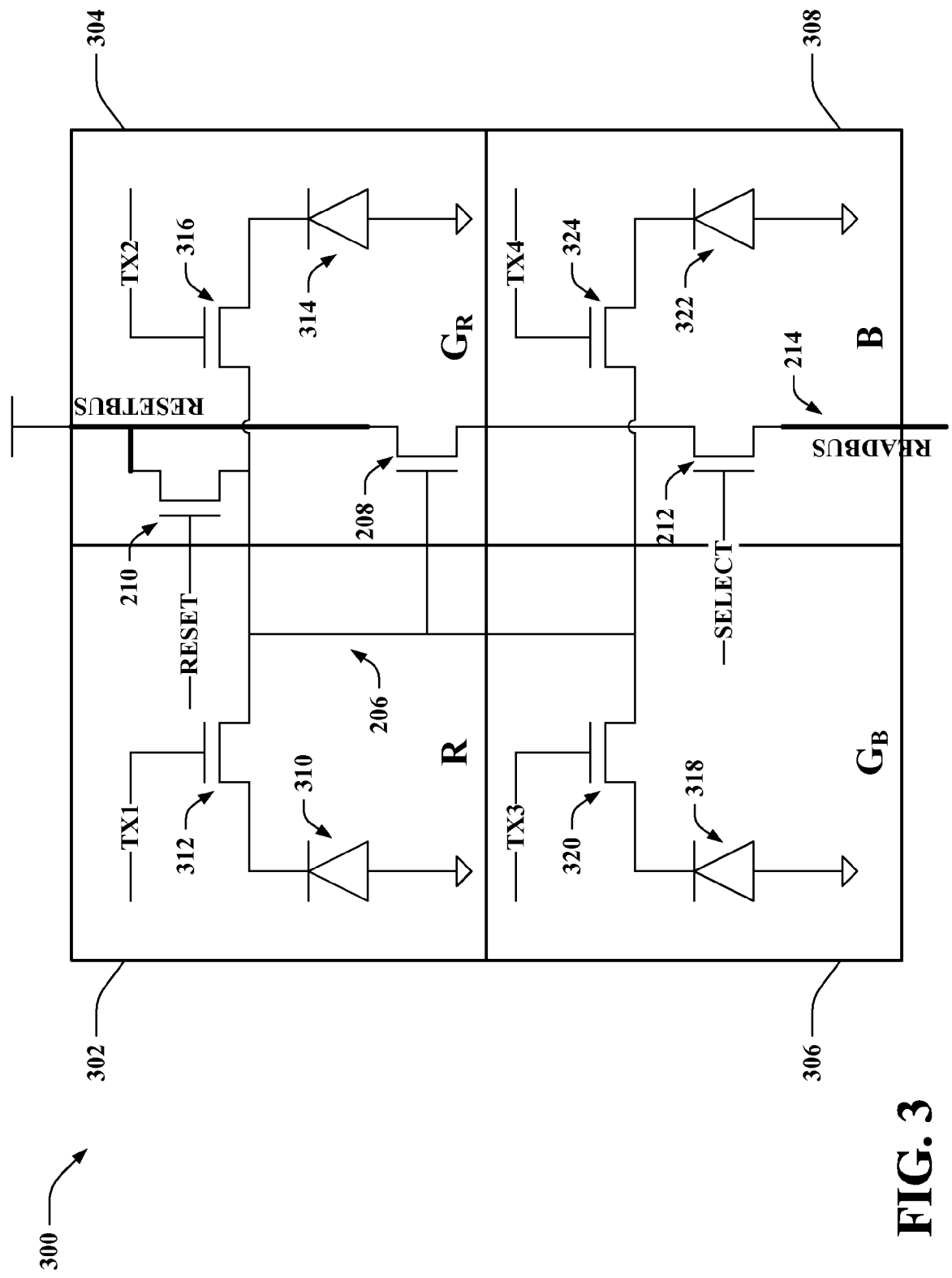
FIG. 3 illustrates an example two-by-two pixel structure.

Referring to FIG. 3, illustrated is an example two-by-two pixel structure 300. The pixel structure 300 includes four pixels oriented according to a pattern; in particular, the pixel structure 300 includes a red pixel (R pixel) 302, a green pixel next to a red pixel ($G_R$ pixel) 304, a green pixel next to a blue pixel ($G_B$ pixel) 306, and a blue pixel (B pixel) 308. The green pixels 304 and 306 are differentiated from each other based upon the alternating color in the respective row, and this differentiation provides a manner of identifying four separate color planes. The pixel structure 300 can be a basic building block within a pixel array; thus, the pixel array (e.g. the pixel array 102 of FIG. 1) can include substantially any number of two-by-two pixel structures similar to the pixel structure 300. It is to be appreciated, however, that the claimed subject matter is not limited to employing the color pattern depicted in FIG. 3 as the four color planes can be oriented with respect to each other within the pixel structure 300 pursuant to substantially any pattern.

The two-by-two pixel structure 300 includes a plurality of shared components (e.g., illustrated as being included in the box 216 in FIG. 2). In particular, the two-by-two pixel structure 300 comprises the floating diffusion region 206, the source follower transistor 208, the reset transistor 210, the select transistor 212, and the read bus 214 as described above, each of which can be shared between the four pixels 302-308. By sharing these components 206-214, the overall footprint of the pixel structure 300 can be reduced in comparison to four separate pixel cells.

The pixels 302-308 can each include respective, non-shared photodiodes and transfer transistors. For instance, the R pixel 302 can include a photodiode 310 operative based upon red light and a transfer transistor 312, the $G_R$ pixel 304 can comprise a photodiode 314 that operates based upon obtaining green light and a transfer transistor 316, the $G_B$ pixel 306 can include a photodiode 318 operative based upon green light and a transfer transistor 320, and the B pixel 308 can include a photodiode 322 that effectuates operation as a function of received blue light and a transfer transistor 324. The transfer transistors 312, 316, 320, 324 can each connect to the floating diffusion region 206.

According to an illustration, a TX1 signal can be obtained at a gate of the transfer transistor 312. Receipt of the TX1 signal can cause the electrical signal received by the red light photodiode 310 to be transferred to the floating diffusion region 206. Similarly, the electrical signals obtained by the green light photodiode 314, the green light photodiode 318, or the blue light photodiode 322 can be transferred to the floating diffusion region 206 upon receiving a TX2 signal at a gate of the transfer transistor 316, a TX3 signal at a gate of the transfer transistor 320, or a TX4 signal at a gate of the transfer transistor 324, respectively.

The two-by-two pixel structure 300 can enable utilizing an 8 micron column buffer. Also, a second sample capacitor can be added for faster operation to increase readout speed. Moreover, a height of the column buffer supporting pixel structure 300 can be about 1.206 mm with all gain options; however, the claimed subject matter is not so limited. The two-by-two pixel structure 300 can provide numerous advantages (as compared to separate pixels, a four-by-one pixel structure, . . . ); namely, the two-by-two pixel structure 300 can facilitate employing a simpler column buffer design and can provide faster operation with two sample capacitors. Further, the twoby-two pixel structure 300 can reduce a number of memory banks, memory size, both x and y dimensions, and/or power consumption.

Figure 4:
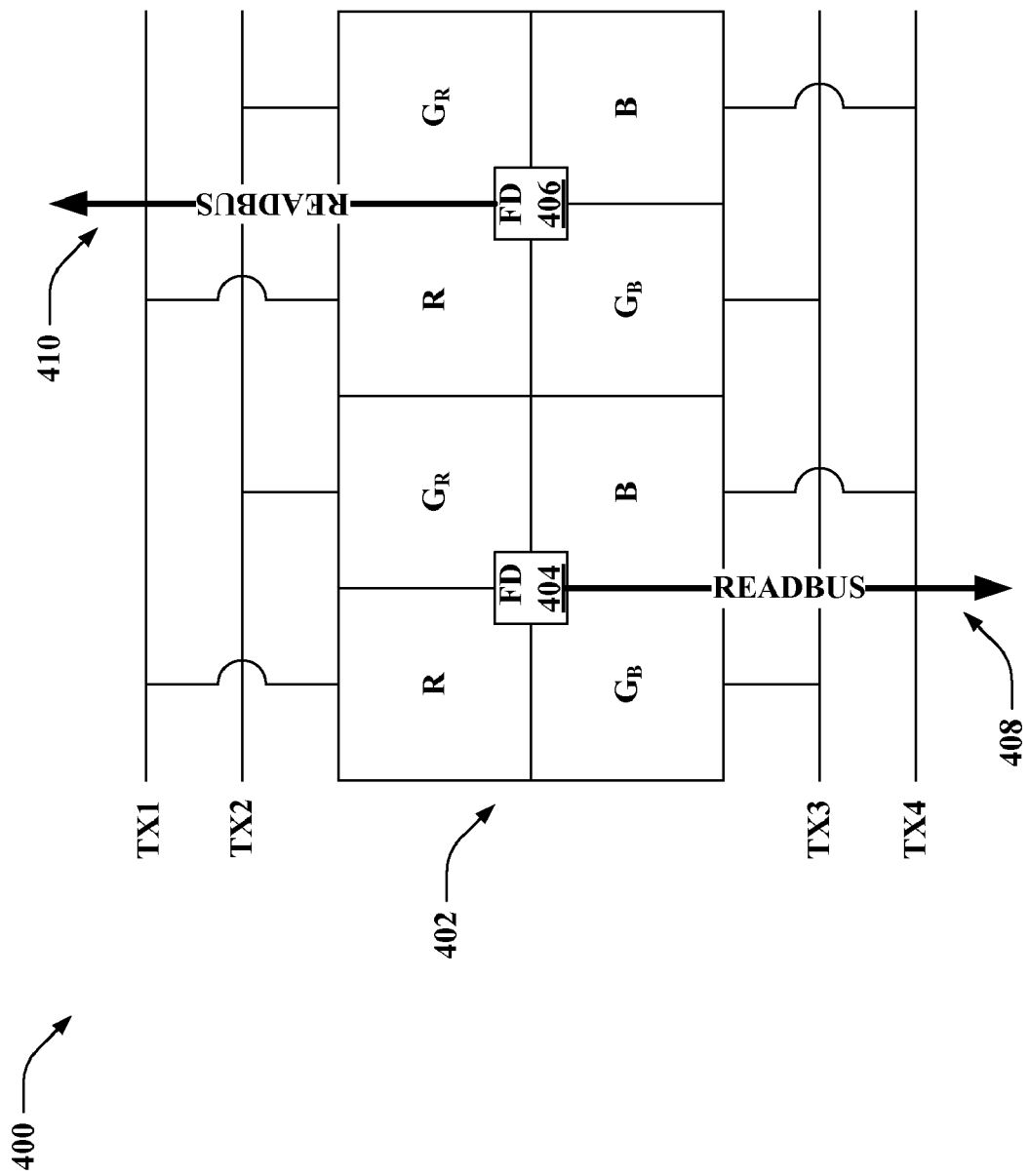
FIG. 4 illustrates an example system with a CMOS sensor imager pixel array built upon two-by-two pixel structures.

With reference to FIG. 4, illustrated is an example system 400 with a CMOS sensor imager pixel array 402 built upon two-by-two pixel structures. As shown in the system 400, the array 402 can include 2 two-by-two pixel structures positioned adjacent to each other, each of which can be substantially similar to the two-by-two pixel structure 300 of FIG. 3. For instance, a first pixel structure can include a floating diffusion region 404 and a second pixel structure can include a floating diffusion region 406. It is to be appreciated that the array 402 is provided for illustration purposes, and the claimed subject matter contemplates employing arrays that include substantially any number of two-by-two pixel structures oriented in substantially any manner with respect to one another.

As illustrated, TX1 (e.g., a first transfer gate signal) can be connected to the R pixels in both pixel structures, TX2 (e.g., a second transfer gate signal) can be connected to the $G_R$ pixels in both pixel structures, TX3 (e.g., a third transfer gate signal) can be connected to the $G_B$ pixels in both pixel structures, and TX4 (e.g. a fourth transfer gate signal) can be connected to the B pixels in both pixel structures. Further, a read bus 408 can carry sampled signals from the floating diffusion region 404 to a signal chain (e.g., including a first column buffer, a first ADC, . . . ) at a bottom of a chip, while a read bus 410 can transfer sampled signals from the floating diffusion region 406 to a disparate signal chain (e.g., including a second column buffer, a second ADC, . . . ) at a top of the chip. For instance, column buffers (not shown) employed with the system 400 can have widths about equal to twice the pitch of a pixel in the column direction.

Utilization of the system 400 can present various drawbacks. For example, after TX1 is activated, ½ of the R pixels on the first row are read at the top of the chip and the other ½ of the R pixels are read at the bottom of the chip. Likewise, reading of the $G_R$ pixels, $G_B$ pixels, and B pixels are split between the top and bottom of the chip. Accordingly, pixels in the same color plane are sent to separate signal chains on opposite sides of the chip, and the separate signal chains may not be perfectly matched even though the signal chains can be designed identically. Further, mismatch can lead to the same color having different responses depending upon the signal chain utilized for processing. However, the mismatching nature of the differing signal chains can be difficult to correct for due to gain and/or offset differences between the signal chains.

Figure 5:
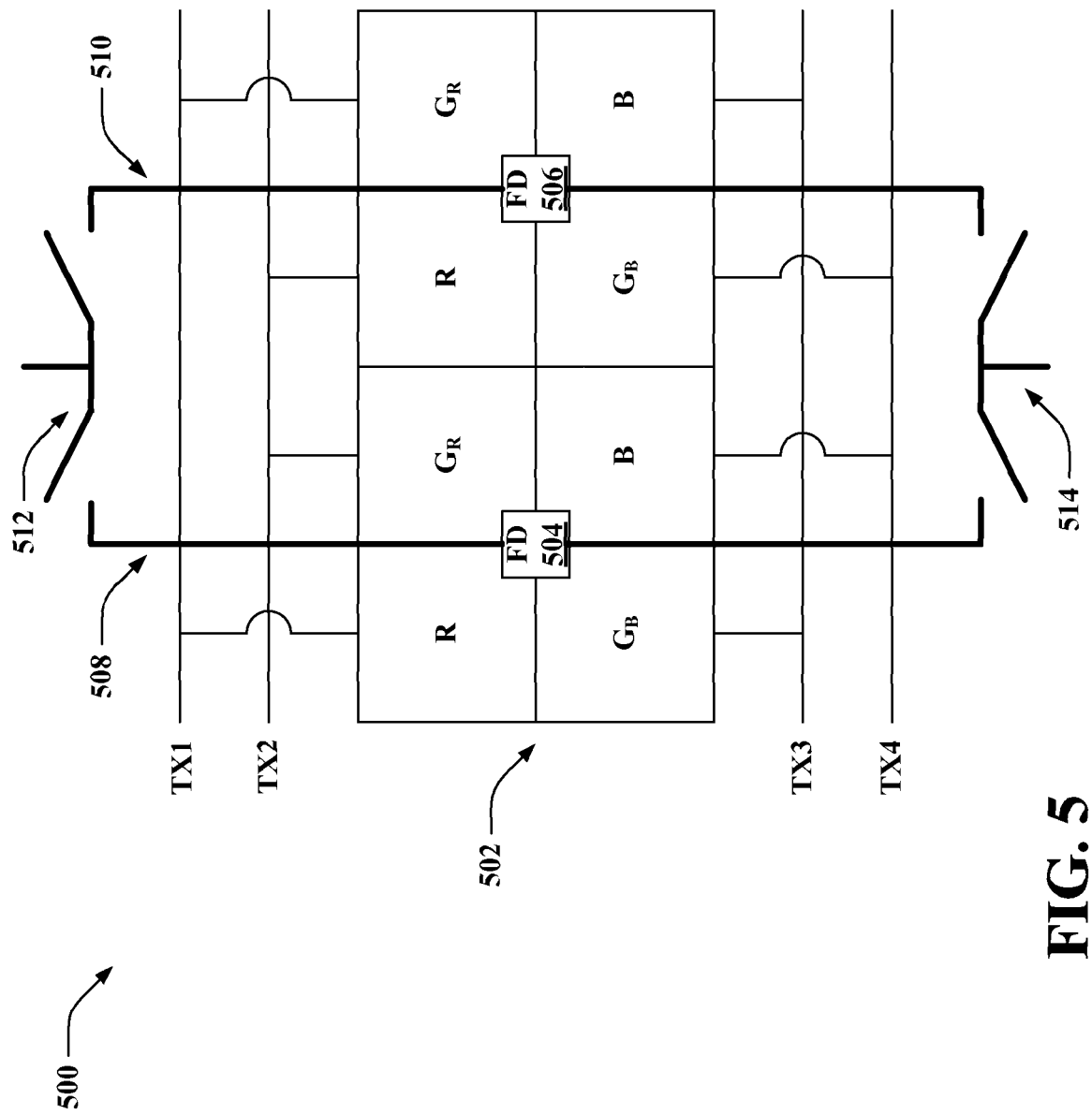
FIG. 5 illustrates an example system with a CMOS sensor imager pixel array constructed from two-by-two pixel structure building blocks.

Now turning to FIG. 5, illustrated is another example system 500 with a CMOS sensor imager pixel array 502 constructed from two-by-two pixel structure building blocks. The array 502 as depicted includes 2 two-by-two pixel structures (e.g., each substantially similar to the two-by-two pixel structure 300 of FIG. 3) located adjacent to one another; however, the claimed subject matter contemplates utilization of an array of any size. Further, a first pixel structure can include a floating diffusion region 504 and a second pixel structure can include a floating diffusion region 506.

Pursuant to the depicted example, TX1 can be connected to the R pixel of the first pixel structure and the $G_R$ pixel of the second pixel structure. Further, TX2 can be connected to the $G_R$ pixel of the first pixel structure and the R pixel of the second pixel structure. Moreover, TX3 can be connected to the $G_B$ pixel of the first pixel structure and the B pixel of the second pixel structure. Additionally, TX4 can be connected to the B pixel of the first pixel structure and the $G_B$ pixel of the second pixel structure.

A read bus 508 can carry sampled signals from the floating diffusion region 504 to a first signal chain at a top of the chip and/or a second signal chain at a bottom of the chip, and a read bus 510 can carry sampled signals from the floating diffusion region 506 to the first signal chain at the top of the chip and/or the second signal chain at the bottom of the chip. Accordingly, the read buses 508-510 can be bidirectional and can run through the entire pixel array 502.

Moreover, the system 500 can include multiplexers at each side of the chip; for instance, a multiplexer 512 can be positioned at the top of the chip and a multiplexer 514 can be located at the bottom of the chip. The multiplexers 512-514 can select whether to connect to the read bus 508 and/or the read bus 510 at a given time. According to an illustration, the multiplexer 512 can connect to the read bus 508 and the multiplexer 514 can connect to the read bus 510 at a particular time. Following this illustration, at a next sampling time, the multiplexer 512 can connect to the read bus 510 while the multiplexer 514 can connect to the read bus 508. Thus, the multiplexers 512-514 can effectuate directing sampled signals to desired locations within the chip for further processing via differing signal chains.

The system 500 provides a pattern for a pair of two-by-two pixel structures adjacently positioned with respect to each other in the column direction. Rather than separating columns by odd and even (e.g. as in the system 400 in FIG. 4), disparate pairings across the pair of adjacent pixel structures can be employed. Thus, in a row, one pair can be controlled by a first TX signal, while another pair can be controlled by a second TX signal. Further, this pattern can be repeated for the entire row. Moreover, there need not be concern that green and blue pixels are binned together since the pixels that share a transfer gate signal do not share a common floating diffusion region.

The system 500 can mitigate deleterious results stemming from signal chain mismatch by controlling which signal chain processes pixels of each color type. For example, when TX1 is activated, half of the red pixels and half of the green pixels (e.g., half of the $G_R$ pixels) can be transferred from the first row. Further, when TX2 is activated, the other half of the red pixels and the other half of the green pixels (e.g., the other half of the $G_R$ pixels) can be transferred from the first row. Since in both transfers half of the data related to red pixels and half of the data relates to green pixels, it is possible to have pixels in the same color plane read on the same side of the chip to enhance matching. The color of the pixel read on each column bus 508-510 depends on which TX is fired. Moreover, the multiplexers 512-514 at the ends of each pair of column buses 508-510 on both sides of the chip can select the color to be read at each side.

Column select signals can be provided to multiplexers 512-514 on each side of the chip, respectively, to enable selecting columns from which to read (e.g., facilitate choosing between the read bus 508 and the read bus 510). Hence, operation of a set of multiplexers (including the multiplexer 512) at the top of the chip can be synchronized with one another, and operation of a differing set of multiplexers (including the multiplexer 514) at the bottom of the chip can be synchronized with each other. For example, when sampling with TX1, the column select signal provided to the set of multiplexers at the top can enable selecting the read bus 508 and the column select signal provided to the differing set of multiplexers at the bottom of the chip can enable selecting the read bus 510; accordingly, R pixels are read at the top and $G_R$ pixels are read at the bottom. Moreover, when sampling utilizing TX2, the top column select signal can initiate the set of multiplexers at the top to select the read bus 510 and the bottom column select signal can cause the differing set of multiplexers at the bottom to select the read bus 508; thus, R pixels can again be read at the top and $G_R$ pixels can be read at the bottom. Additionally, the second row can similarly be read; therefore, $G_B$ pixels can be read at the top of the chip and B pixels can be read at the bottom of the chip. Pursuant to another example, the polarity of the column select signals can be altered for the second row so that B pixels can be read at the top of the chip and $G_B$ pixels can be read at the bottom of the chip, thereby enabling all green pixels (e.g., $G_B$ pixels and $G_R$ pixels) to be read on a common side of the imager.

The system 500 can include increased complexity as compared to the system 400 of FIG. 4. In particular, the market generally is moving towards the design in FIG. 4 due to the simplicity and the need to increase device density. However, an unexpected consequence that can be yielded from the design in FIG. 4 is the color mismatch issue. Accordingly, the added complexity associated with the architecture set forth in FIG. 5 can offset the mismatch problem to yield an overall net gain.

Figure 6:
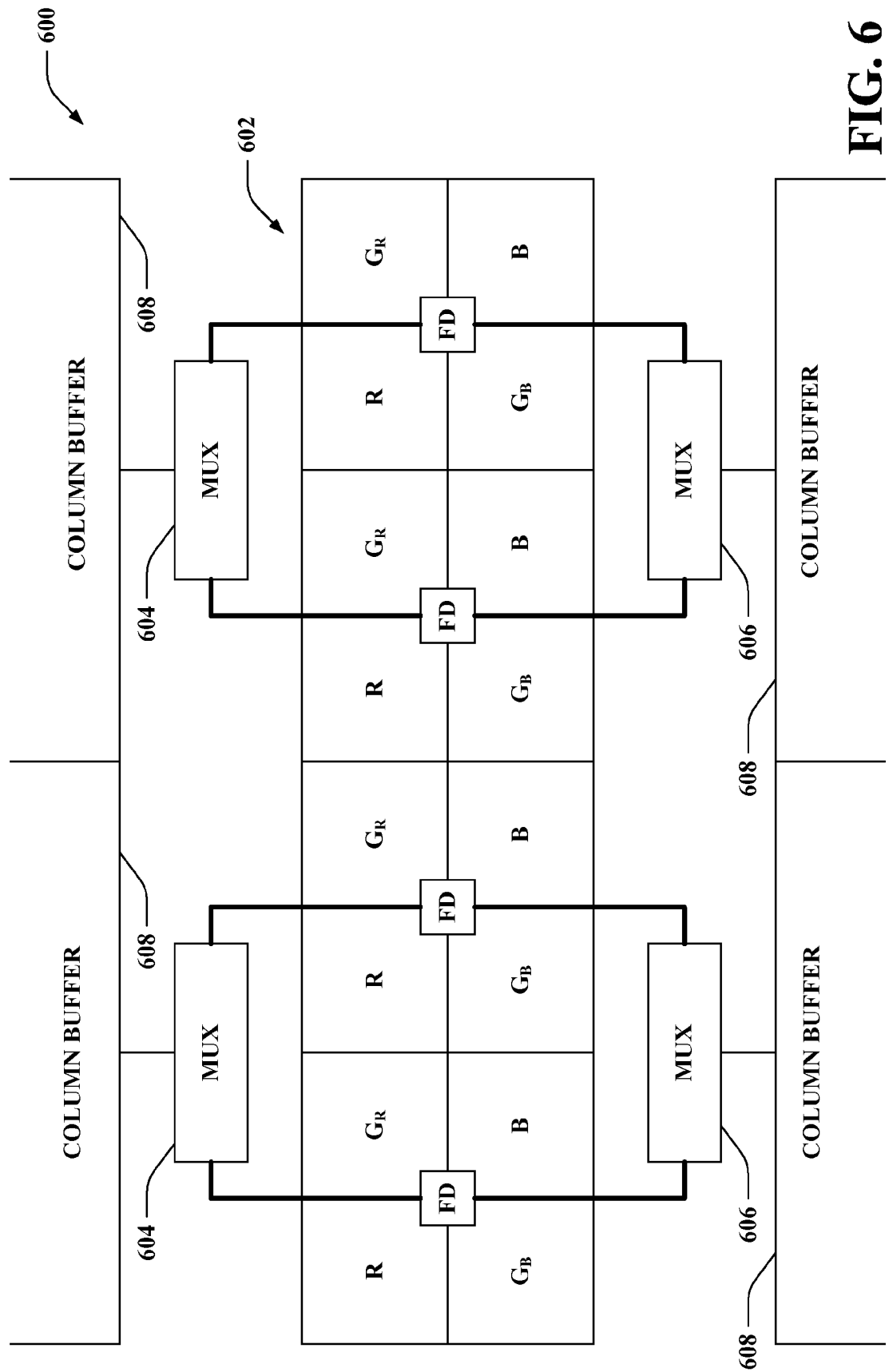
FIG. 6 illustrates an example system that leverages two-by-two pixel structures within a CMOS sensor imager pixel array.

Turning to FIG. 6, illustrated is a system 600 that leverages two-by-two pixel structures within a CMOS sensor imager pixel array 602. The system 600 includes a plurality of multiplexers 604 on a top end of a chip and a plurality of multiplexers 606 on a bottom end of the chip. As described above, the multiplexers 604-606 enable controlling selection of read buses from which to obtain sampled signals. Moreover, the multiplexers 604-606 can each be coupled to a respective column buffer 608; the column buffers 608 can amplify, condition, etc. the sampled signals received from the pixels (e.g., via the floating diffusion regions) by way of the read buses. A subset of the column buffers 608 can be at the top end of the chip and a remainder of the column buffers 608 can be at a bottom end of the chip. Additional processing can also be effectuated by employing various other component(s) (not shown) positioned at either end of the chip. By utilizing the architecture illustrated in FIG. 6, the width of each column buffer 608 can be about four times the pitch in the column direction of each pixel in the array 602. Further, pixels in the same color plane can be read on the same side of the chip, which can mitigate effects associated with circuit mismatch, by employing the system 600; hence, the same gain can be applied to pixels associated with the same color plane. The architecture described herein can beneficially impact system integration, particularly on the silicon area reduction. Column fixed pattern noise (FPN) is usually a consequence of the column buffer amplifier dispersion. Conventional column FPN correction algorithms use a memory node in the digital section to store the offset generated by each amplification element. As only half of the column buffers are needed with the architecture of system 600, the FPN memory size can consequently be halved (e.g., utilize ½ line-worth of memory bank). This can lead to a significant real estate reduction in the digital section.

Figure 7:
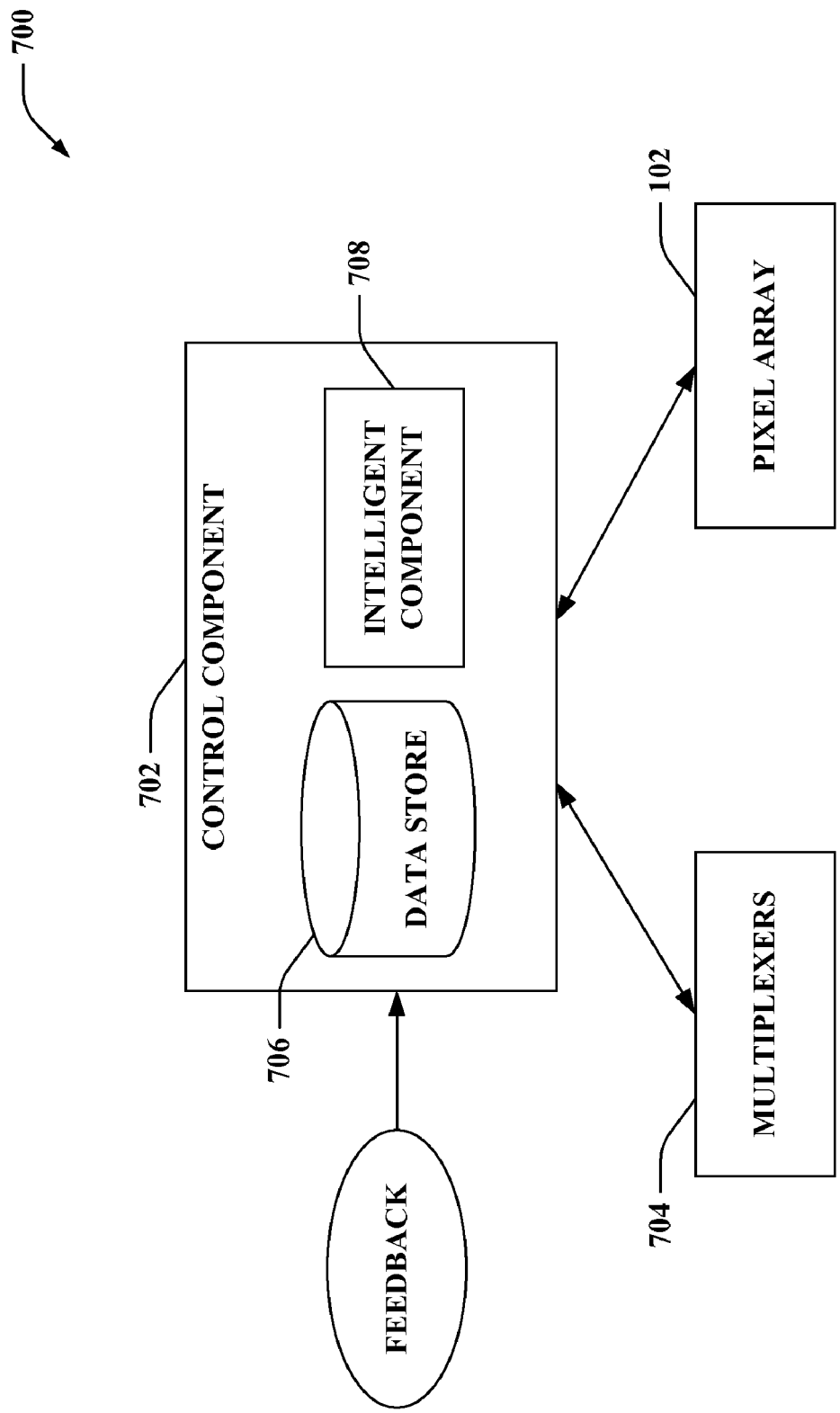
FIG. 7 illustrates a block diagram of an example system that controls, coordinates, adjusts, etc. operation within a CMOS sensor imager.

Referring now to FIG. 7, illustrated is a system 700 that controls, coordinates, adjusts, etc. operation within a CMOS sensor imager. The system 700 includes the pixel array 102 that comprises the two-by-two pixel structure building blocks as described above. Further, the system 700 includes a control component 702 that can control the pixel array, multiplexers 704 (e.g., the multiplexers 512-514 of FIG. 5, the multiplexers 604-606 of FIG. 6, . . . ), as well as any disparate component(s) (not shown) associated with the CMOS sensor imager. According to an illustration, the control component 702 can obtain feedback data, and based upon the feedback data, the control component 702 can alter operation related to the pixel array 102, one or more of the multiplexers 704, and the like. Pursuant to another example, the control component 702 can control timing within the system 700; hence, the control component 702 can coordinate sampling signals from pixels in a particular row, selecting read buses from which to obtain data with the multiplexers 704, and the like based upon the timing. The control component 702 can further include a data store 706 and/or an intelligent component 708.

The data store 706 can retain historical data, trending data, feedback data, etc. that can be analyzed by the control component 702 in connection with controlling operation within the system 700. The data store 706 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 706 of the subject systems and methods is intended to comprise, without being limited to, these and any other suitable types of memory. In addition, it is to be appreciated that the data store 706 can be a server, a database, a hard drive, and the like.

Further, the intelligent component 708 can be employed by the control component 702 to reason about whether to alter a side of a chip upon which sample signals from a particular color plane are to be read. Such reasoning can be leveraged to adjust read bus selection effectuated by the multiplexers 704, for instance. Pursuant to another example, the intelligent component 708 can infer an amount of difference in gain and/or offset between disparate signal chains included on the chip; accordingly, the control component 702 can modify settings associated with component(s) in each of the disparate signal chains to mitigate the inferred differences.

It is to be understood that the intelligent component 708 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 8:
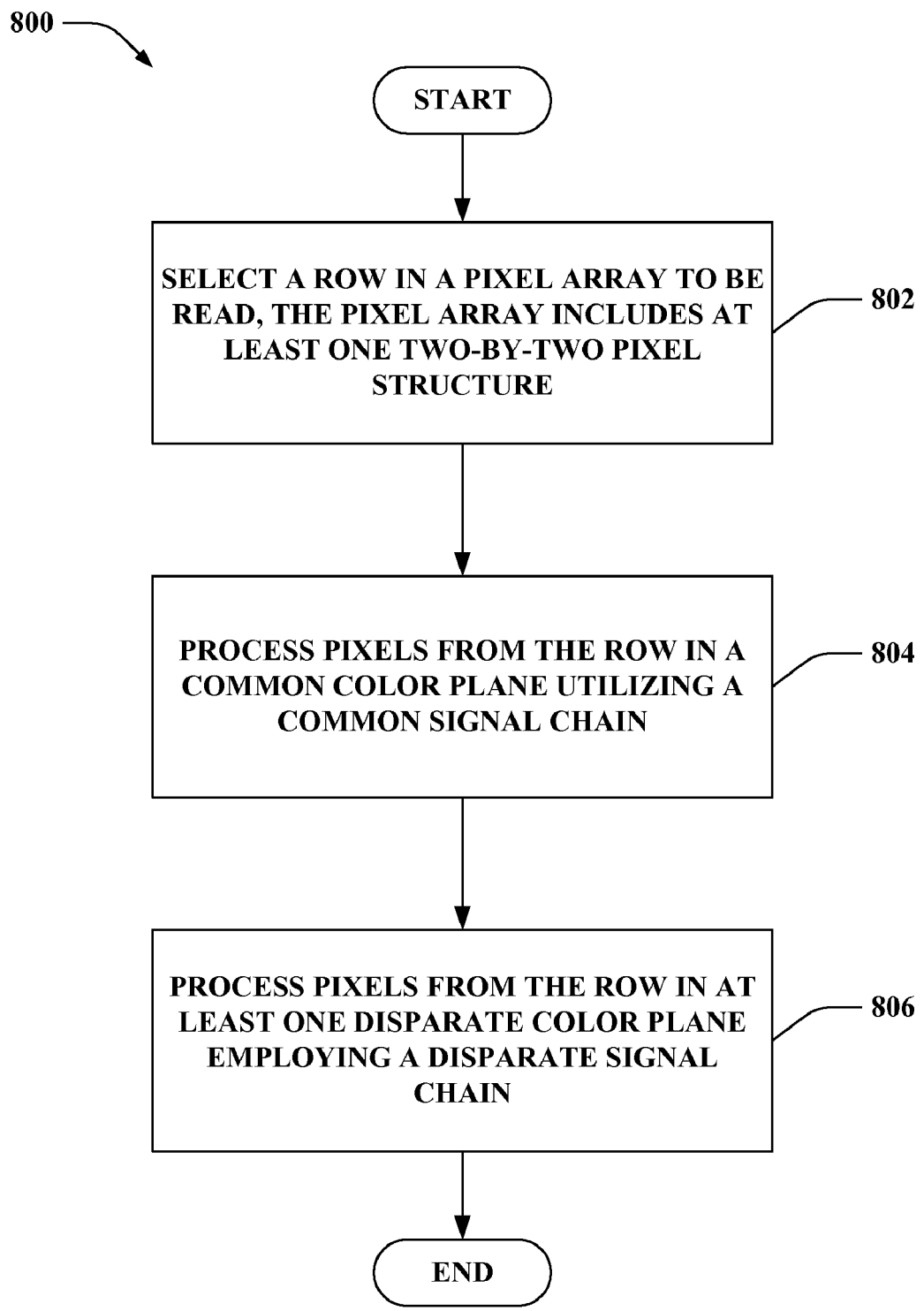
FIG. 8 illustrates an example methodology that facilitates employing a CMOS sensor imager.
Figure 9:
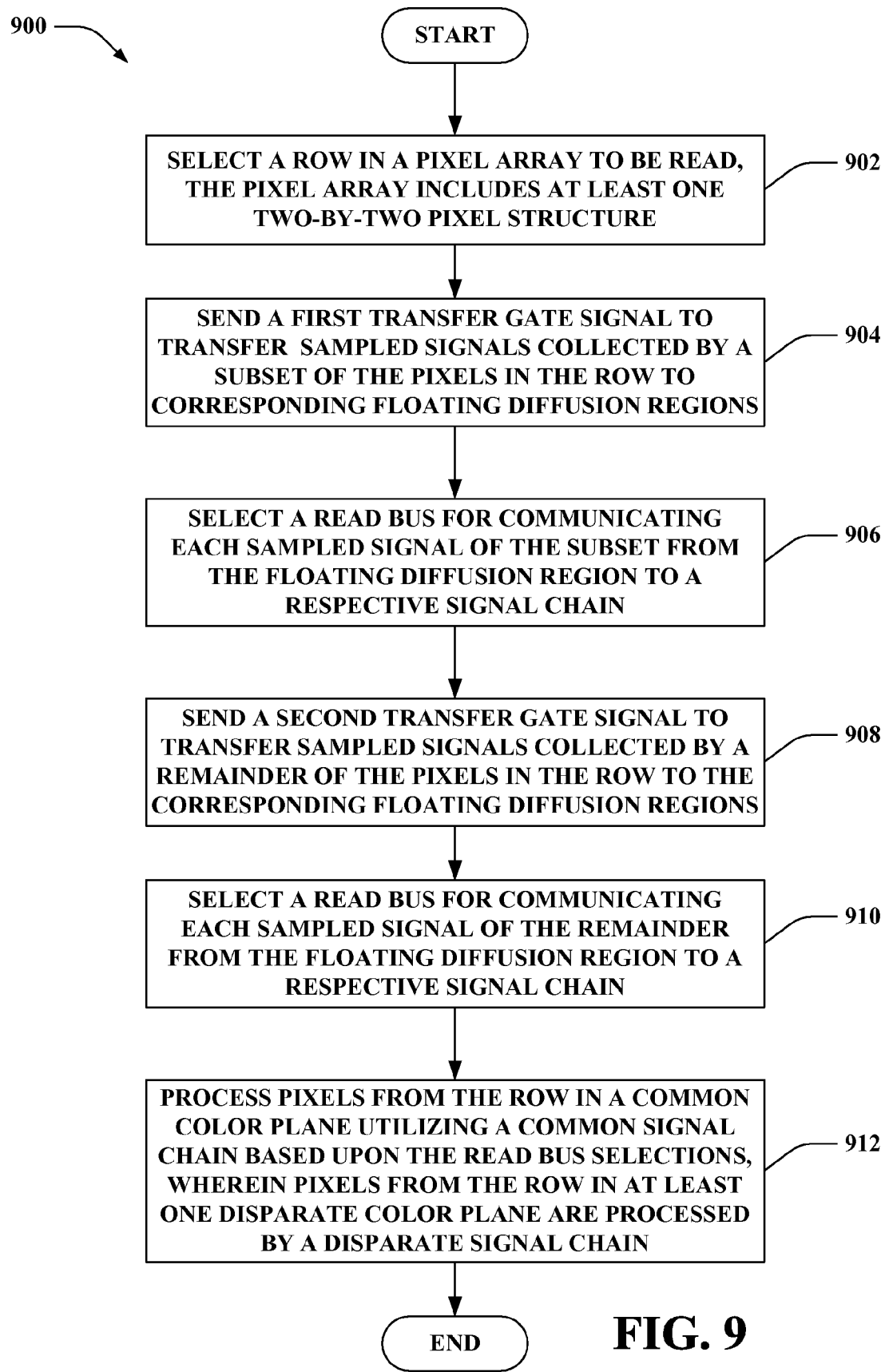
FIG. 9 illustrates an example methodology that facilitates multiplexing sampled signals to mitigate effects of mismatch in a CMOS sensor imager.

FIGS. 8-9 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

Turning to FIG. 8, illustrated is a methodology 800 that facilitates employing a CMOS sensor imager. At 802, a row in a pixel array to be read can be selected. The pixel array can include at least one two-by-two pixel structure. The two-by-two pixel structure can include a plurality of shared components. Further, the two-by-two pixel structure can comprise four non-shared photodiodes, each of which corresponds to one of four pixels of the array. Moreover, each of these four pixels included in the two-by-two pixel structure can be in a respective color plane; thus, the four pixels can include an R pixel, a $G_R$ pixel, a B pixel, and a $G_B$ pixel. At 804, pixels from the row in a common color plane can be processed by utilizing a common signal chain. At 806, pixels from the row in at least one disparate color plane can be processed by employing a disparate signal chain.

Now referring to FIG. 9, illustrated is a methodology 900 that facilitates multiplexing sampled signals to mitigate effects of mismatch in a CMOS sensor imager. At 902, a row in a pixel array to be read can be selected, wherein the pixel array can include at least one two-by-two pixel structure. At 904, a first transfer gate signal can be sent to transfer sampled signals collected by a subset of the pixels in the row to corresponding floating diffusion regions. At 906, a read bus can be selected for communicating each sampled signal of the subset from the floating diffusion region to a respective signal chain. At 908, a second transfer gate signal can be sent to transfer sampled signals collected by a remainder of the pixels in the row to the corresponding floating diffusion regions. At 910, a read bus can be selected for communicating each sampled signal of the remainder from the floating diffusion region to a respective signal chain. At 912, pixels from the row in a common color plane can be processed utilizing a common signal chain based upon the read bus selections. Moreover, pixels from the row in at least one disparate color plane can be processed by a disparate signal chain.

Figure 10:
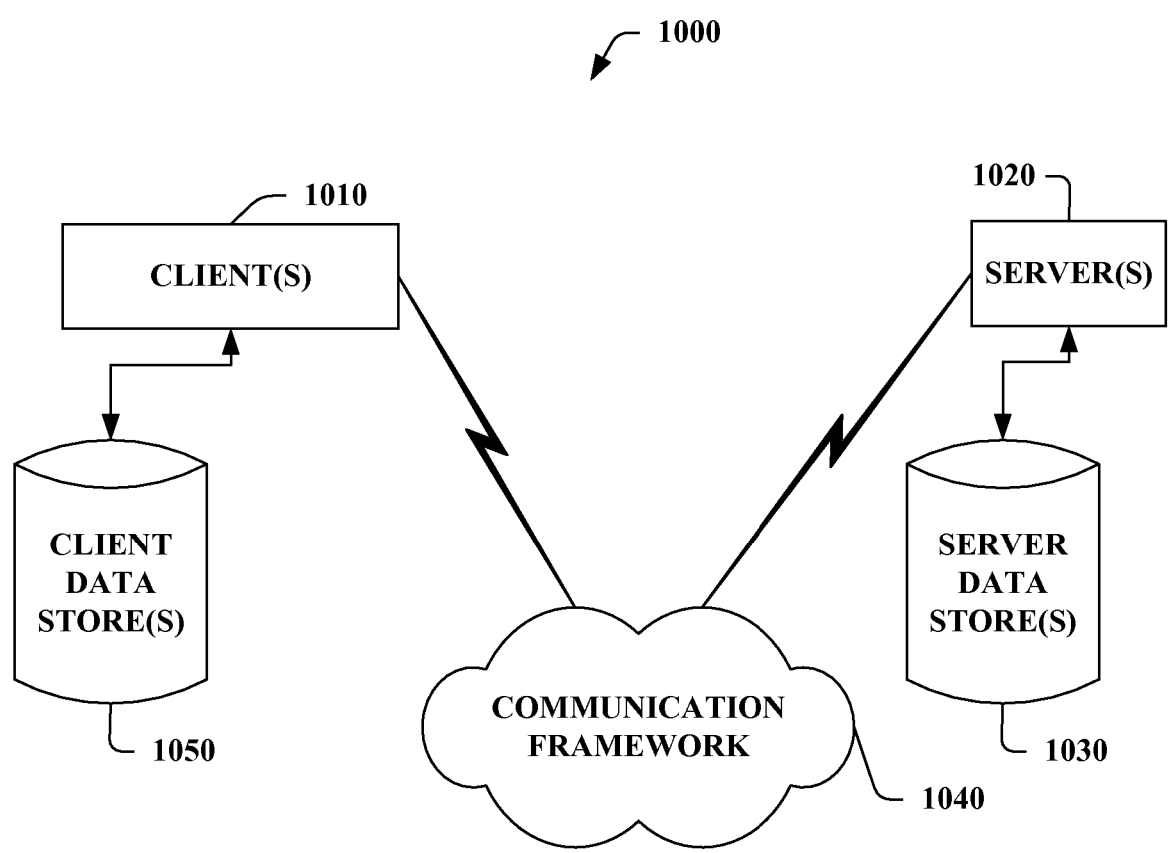
FIG. 10 illustrates an example networking environment, wherein the novel aspects of the claimed subject matter can be employed.
Figure 11:
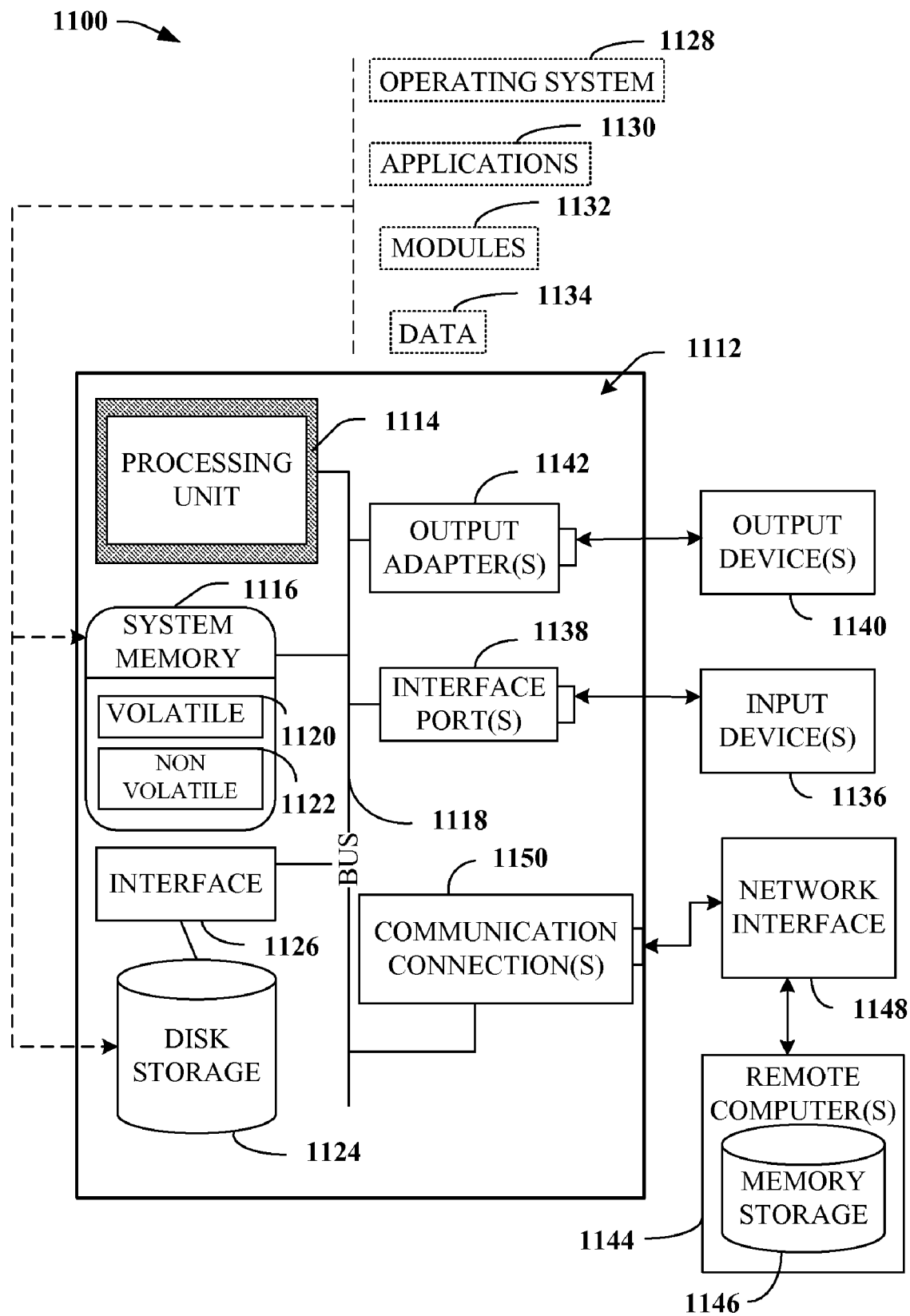
FIG. 11 illustrates an example operating environment that can be employed in accordance with the claimed subject matter.

In order to provide additional context for implementing various aspects of the claimed subject matter, FIGS. 10-11 and the following discussion is intended to provide a brief, general description of a suitable computing environment in which the various aspects of the subject innovation may be implemented. For instance, FIGS. 10-11 set forth a suitable computing environment that can be employed in connection with controlling operation within CMOS sensor imagers that include two-by-two pixel structures within pixel arrays. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 10 is a schematic block diagram of a sample-computing environment 1000 with which the claimed subject matter can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads to perform transformations by employing the subject innovation, for example.

One possible communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 1010. Similarly, the server(s) 1020 are operably connected to one or more server data store(s) 1030 that can be employed to store information local to the servers 1020.

With reference to FIG. 11, an exemplary environment 1100 for implementing various aspects of the claimed subject matter includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), or flash memory. Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the claimed subject matter can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A complementary metal-oxide-semiconductor (CMOS) imaging system-on-chip (iSoC) sensor system, comprising:
   a pixel array constructed as an array of two-by-two pixel structures, comprising:
      a first two-by-two pixel structure and a second two-by-two pixel structure, wherein the first two-by-two pixel structure and the second two-by-two pixel structure respectively include four pixels configured to share at least one component;
   a plurality of read buses respectively associated with columns of two-by-two pixel structures of the pixel array, comprising:
      a first read bus associated with the first two-by-two pixel structure and a second read bus associated with the second two-by-two pixel structure; and
   a plurality of multiplexers respectively positioned at ends of pairs of read buses, comprising:
      a first multiplexer configured to select one of the first read bus or the second read bus from which to transfer a first sampled signal, from one of the first two-by-two pixel structure or the second two-by-two pixel structure, to a first signal chain; and
      a second multiplexer configured to select one of the first read bus or the second read bus from which to transfer a second sampled signal to a second signal chain, wherein the second multiplexer selects a disparate read bus from the first multiplexer,
   wherein the first multiplexer and second multiplexer coordinate selection such that signal information, from the first two-by-two pixel structure and the second two-by-two pixel structure, corresponding to a same color plane are transferred to a same signal chain.

2. The system of claim 1, wherein the first two-by-two pixel structure and the second two-by-two pixel structure each include a red pixel, a green pixel next to the red pixel, a blue pixel, and a green pixel next to the blue pixel.

3. The system of claim 1, wherein the first two-by-two pixel structure and the second two-by-two pixel structure each comprise the at least one component that is shared and non-shared components, wherein the non-shared components include at least one of a photodiode or a transfer transistor, and the at least one component that is shared includes at least one of a floating diffusion region, a source follower transistor, a reset transistor, a select transistor, or a read bus.

4. The system of claim 1, wherein the first read bus and the second read bus transfer sampled signals from respective floating diffusion regions included in the first two-by-two pixel structure and the second two-by-two pixel structure, wherein one pixel out of four pixels from the first two-by-two pixel structure and one pixel of out four pixels from the second two by-two pixel structure transfer electrical signals related to the sampled signals to the respective floating diffusion regions.

5. The system of claim 4, wherein the one pixel from the first two-by-two structure and the one pixel from the second two-by-two structure transfer the electrical signals from respective photodiodes to the respective floating diffusion regions in response to receiving respective transfer signals at gates of associated transfer transistors.

6. The system of claim 1, wherein the plurality of multiplexers are further configured to direct the first sampled signal and the second sampled signal to locations within a chip for further processing via different signal chains.

7. The system of claim 1, wherein the plurality of multiplexers are further configured to receive column select signals that synchronize the plurality of multiplexers with regard to selection of read buses from which to read.

8. The system of claim 1, wherein the plurality of multiplexers are further configured to enable pixels associated with a first set of color planes to be read on a first side of a chip and pixels associated with a second set of color planes to be read on a second side of the chip, and wherein the first set includes two color planes and the second set includes two color planes that differ from the two color planes of the first set.

9. The system of claim 8, wherein the first set includes red pixels and blue pixels, and the second set includes green pixels next to red pixels and green pixels next to blue pixels.

10. The system of claim 8, wherein the first set includes red pixels and green pixels next to blue pixels, and the second set includes blue pixels and green pixels next to red pixels.

11. The system of claim 1, further comprising a plurality of column buffers respectively connected to the plurality of multiplexers.

12. The system of claim 11, wherein a width of each of the plurality of column buffers is four times or approximately four times a pitch of a pixel in the pixel array in a column direction.

13. The system of claim 1, further comprising a control component configured to control operations associated with the pixel array and the plurality of multiplexers.

14. A method for a complementary metal-oxide-semiconductor (CMOS) sensor imager, comprising:
   selecting, by a first multiplexer positioned at an end of a first pair of read busses, a first read bus associated with a column of a first two-by-two pixel structure of a pixel array from which to transfer a first sampled signal from the first two-by-two pixel structure to a first signal chain;
   selecting, by a second multiplexer positioned at an end of a second pair of read busses, a second read bus associated with a column of a second two-by-two pixel structure of the pixel array from which to transfer a second sampled signal from the second two-by-two pixel structure to a second signal chain, the first two-by-two pixel structure and the second two-by-two pixel structure respectively including four pixels configured to share at least one component; and
   coordinating the selecting the first read bus and the selecting the second read bus such that signal information from the first two-by-two pixel structure and the second two-by-two pixel structure corresponding to a same color plane is transferred to a same signal chain.

15. The method of claim 14, further comprising:
   sending a first transfer gate signal to transfer first sampled signals collected by a subset of pixels in a row of the pixel array to corresponding floating diffusion regions;
   selecting the first read bus for communicating the first sampled signals from the corresponding floating diffusion regions to respective signal chains;
   sending a second transfer gate signal to transfer second sampled signals collected by a remainder of the pixels in the row to the corresponding floating diffusion regions; and
   selecting the second read bus for communicating the second sampled signals of the remainder from the corresponding floating diffusion regions to respective signal chains.

16. The method of claim 15, further comprising controlling the selecting the first read bus or the selecting the second read bus based upon a column select signal obtained by at least one of the first multiplexer or the second multiplexer.

17. The method of claim 14, further comprising reading pixels in the same color plane on a same side of a chip to mitigate mismatch between the first signal chain and the second signal chain.

18. The method of claim 14, the first two-by-two pixel structure and the second two-by-two pixel structure each including a red pixel, a green pixel next to the red pixel, a blue pixel, and a green pixel next to the blue pixel, and the first two-by-two pixel structure and the second two-by-two pixel structure each further including non-shared components.

19. The method of claim 14, further comprising directing the first sampled signal and the second sampled signal to locations within a chip for further processing via differing signal chains.

20. A complementary metal-oxide-semiconductor (CMOS) sensor imager system, comprising:

means for selecting a first read bus associated with a first two-by-two pixel structure of a pixel array from which to transfer a first sampled signal from the first two-by-two pixel structure to a first signal chain;

means for selecting a second read bus associated with a second two-by-two pixel structure of the pixel array from which to transfer a second sampled signal from the second two-by-two pixel structure to a second signal chain, the first two-by-two pixel structure and the second two-by-two pixel structure respectively including four pixels configured to share at least one component; and means for coordinating the means for selecting the first read bus and the means for selecting the second read bus wherein signal information from the first two-by-two pixel structure and the second two-by-two pixel structure corresponding to a same color plane is transferred to a same signal chain.

* * * * *